US009077467B2

(12) United States Patent
Shi et al.

(10) Patent No.: US 9,077,467 B2
(45) Date of Patent: Jul. 7, 2015

(54) METHOD AND DEVICE FOR SELECTING USER TERMINAL SO AS TO ENHANCE RECIPROCITY ERROR CALIBRATION BETWEEN UPLINK AND DOWNLINK

(75) Inventors: Jing Shi, PuDong Jinqiao Shanghai (CN); Qinglin Luo, PuDong Jinqiao Shanghai (CN); Yan Zhao, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 137 days.

(21) Appl. No.: 13/810,521

(22) PCT Filed: Jul. 15, 2011

(86) PCT No.: PCT/IB2011/001867
§ 371 (c)(1),
(2), (4) Date: Jan. 16, 2013

(87) PCT Pub. No.: WO2012/007837
PCT Pub. Date: Jan. 19, 2012

(65) Prior Publication Data
US 2013/0114478 A1 May 9, 2013

(30) Foreign Application Priority Data
Jul. 16, 2010 (CN) .......................... 2010 1 0229368

(51) Int. Cl.
*H04J 3/00* (2006.01)
*H04W 24/08* (2009.01)
(Continued)

(52) U.S. Cl.
CPC . *H04J 3/00* (2013.01); *H04B 7/024* (2013.01); *H04W 24/08* (2013.01); *H04W 24/10* (2013.01); *H04B 17/21* (2015.01); *H04B 17/309* (2015.01)

(58) Field of Classification Search
CPC ......... H04L 5/14; H04L 5/001; H04L 5/0055; H04L 43/08; H04L 5/0053; H04J 3/1694; H04B 7/2656; H04W 24/08; H04W 24/10; H04W 24/00; H04W 24/02; H04W 76/02; H04W 76/022; H04W 8/22; H04W 36/30; H04W 36/14; H04W 36/0094
USPC .................................. 370/328, 280, 250, 332
See application file for complete search history.

(56) References Cited

U.S. PATENT DOCUMENTS

| 7,916,689 | B2 * | 3/2011 | Jeong et al. .................... 370/328 |
| 2005/0136951 | A1 * | 6/2005 | Gibbons et al. ............... 455/464 |

(Continued)

FOREIGN PATENT DOCUMENTS

| CN | 101729140 A | 6/2010 |
| EP | 1551143 A | 7/2005 |

(Continued)

OTHER PUBLICATIONS

Qualcomm Europe, "Calibration Procedures for TDD Beamforming," 3rd Generation Partnership Project (3GPP), 3GPP TSG RAN1 #51bis, R1-080494, pp. 1-6, Sevilla, Spain, Jan. 14-18, 2008.
(Continued)

*Primary Examiner* — Andrew Chriss
*Assistant Examiner* — Atique Ahmed
(74) *Attorney, Agent, or Firm* — Fay Sharpe LLP (57) ABSTRACT

The present invention provides a method and a device for selecting user terminal so as to enhance calibration for reciprocity error between uplink and downlink, in the purpose of enhancing the accuracy of calibration for reciprocity error between uplink and downlink in TDD system. Wherein, the method comprises the following steps: obtaining channel quality related information between a plurality of first user terminals and a first base station, wherein said channel quality related information is used for indicating channel qualities between said plurality of first user terminals and said first base station; selecting, at least one first user terminal as a calibration user terminal for calibrating said reciprocity error between uplink and downlink, according to said channel quality related information.

13 Claims, 4 Drawing Sheets

(51) Int. Cl.
*H04B 17/21* (2015.01)
*H04B 17/309* (2015.01)
*H04B 7/02* (2006.01)
*H04W 24/10* (2009.01)

(56) References Cited

U.S. PATENT DOCUMENTS

| | | |
|---|---|---|
| 2007/0206504 A1 | 9/2007 | Koo et al. |
| 2008/0220790 A1* | 9/2008 | Cai et al. ............... 455/450 |
| 2009/0046582 A1* | 2/2009 | Sarkar et al. ............ 370/230.1 |
| 2010/0159921 A1* | 6/2010 | Choi et al. ............. 455/425 |
| 2010/0260147 A1* | 10/2010 | Xing et al. ............. 370/332 |
| 2010/0303015 A1* | 12/2010 | Ko et al. ............... 370/328 |
| 2010/0322102 A1* | 12/2010 | Zhou et al. ............. 370/252 |

FOREIGN PATENT DOCUMENTS

| WO | 2007/024851 A2 | 3/2007 |
|---|---|---|
| WO | WO2010/053684 A2 | 5/2010 |

OTHER PUBLICATIONS

International Search Report for PCT/IB2011/001867 dated Dec. 1, 2011.

Notice of Preliminary Rejection for corresponding Korean Application No. 10-2013-7003727, dated Dec. 20, 2013, pp. 1-4.

* cited by examiner

METHOD AND DEVICE FOR SELECTING USER TERMINAL SO AS TO ENHANCE RECIPROCITY ERROR CALIBRATION BETWEEN UPLINK AND DOWNLINK

FIELD OF THE INVENTION

The present invention relates to communication field, and more particularly relates to base station and mobile station in time division duplex system.

BACKGROUND OF THE INVENTION

Channel reciprocity character, namely the symmetry character between uplink (UL) and downlink (DL) frequencies, has good application prospect in LTE-A (Advanced—Long Term Evolution) TDD (Time Division Duplex) system. The industry commonly accepts the assumption of reciprocity between uplink and downlink, and uses the assumption to estimate the channel effectively. However, in practice, for the reason of the difference of RF (Radio Frequency) circuits between the receiver and the transmitter, especially the difference of RF circuits between the receiver and the transmitter at base station side, the reciprocity between uplink and downlink in TDD system is very hard to be guaranteed. For the TDD based system with reciprocity between uplink and downlink, the system performance is highly sensitive to uplink/downlink channel reciprocity errors, slight reciprocity errors between uplink and downlink might cause significant performance degradation. Therefore, reciprocity calibration in TDD system attracts the interest of the industry.

The calibration for OTA (Over The Air) interface of TDD system with reciprocity between uplink and downlink becomes an effective way to guarantee reciprocity between uplink and downlink of TDD system, since there is no need to introduce additional hardware devices. However, the accuracy of OTA calibration mainly depends on channel estimations between uplink and downlink, and thus how to perform user terminal (also called user equipment or UE) selection is an important problem, especially for CoMP (Coordinated Multi Point) system, which user terminals are selected for calibration is a problem urgently to be solved.

Exiting time division duplex technique proposes that the selected user terminals should locate near the center of coordinated multi-point cell cluster, which means only user terminal locations are taken into consideration for user terminal selections.

SUMMARY OF THE INVENTION

Because the selections of user terminal according to user terminal locations only consider the large scale fading. However, considering shadow effect and fast fading, the above-mentioned selection way is inaccurate.

Therefore, the present invention provides a method and corresponding device for selecting user terminal for calibration for reciprocity error between uplink and downlink, so as to enhance the accuracy of calibration for reciprocity error between uplink and downlink in TDD system. The solution of the present invention is suitable for single cell scenario and multi-cell CoMP scenario.

According to the first aspect of the present invention, there is provided a method of selecting user terminal so as to enhance calibration for reciprocity error between uplink and downlink, in a network equipment in time division duplex communication systems, comprising the following steps: obtaining channel quality related information between a plurality of first user terminals and a first base station, wherein said channel quality related information is used for indicating channel qualities between said plurality of first user terminals and said first base station; selecting, at least one first user terminal as a calibration user terminal for calibrating said reciprocity error between uplink and downlink, according to said channel quality related information.

According to the second aspect of the present invention, there is provided a device for selecting user terminal so as to enhance calibration for reciprocity error between uplink and downlink in a network equipment in time division duplex communication systems, comprising: an obtaining means, for obtaining channel quality related information between a plurality of first user terminals and a first base station, wherein, said channel quality related information is used for indicating channel qualities between the plurality of first user terminals and said first base station; a selecting means, for selecting, at least one said first user terminal as calibration user terminal for calibrating said reciprocity error between uplink and downlink, according to said channel quality related information.

The best user terminal may be selected for calibration for reciprocity error between uplink and downlink, with the solution of the present invention. For CoMP scenario, different calibration user terminals may be utilized to realize that any two base stations (BS) in coordinated cell cluster are connected so that the entire cell cluster calibration weights are obtained.

BRIEF DESCRIPTION OF THE DRAWINGS

By reading the detailed description of the non-limiting embodiments with reference to the following drawings, other features, objects and advantages of the present invention will become apparent.

Wherein, same or similar reference signs refer to the same or similar step features or device/module.

DETAILED DESCRIPTION OF EMBODIMENTS

Firstly, radio frequency mismatch model is briefly described.

There is great difference in RF (Radio Frequency) circuits between a wireless transmitter and wireless receiver. By precluding the effect of antenna coupling, the effective channel responses of RF antenna lineups ($H_{br}$, $H_{bt}$, $H_{mr}$, $H_{mt}$) can be modelled as diagonal matrices. Wherein, $H_{br}$, $H_{bt}$, $H_{mr}$, $H_{mt}$ respectively denote response of base station at receiver (RX), response of base station at transmitter (TX), response of user terminal at receiver (RX), response of user terminal at transmitter (TX). For example, response of base station receiver may be represented as $$H_{br} = \begin{bmatrix} h_{br,1} & 0 & 0 \\ 0 & \ldots & 0 \\ 0 & 0 & h_{br,N} \end{bmatrix},$$

where N is the number of base station antennas. The above diagonal matrices are expressed as $h_{br}(t,P,T) = A_{br}(t,P,T)e^{j\square_{br}(t,P,T)}$, wherein A denotes amplitude, and $\square$ denotes phase.

In the reciprocity simulation, one of the most concerned parameters is the ratio of the uplink channel response to the downlink channel response (or vice versa). In general, if the delay of uplink/downlink transmission is neglected, the channel of OTA (Over The Air) interface may be considered as reciprocity. However, the mismatch of antenna lineups will cause that the effective channels (the effective channel from the baseband of transmitter to the baseband of receiver) of unlink and downlink do not satisfy the reciprocity. Based on the previous RF lineup response expression, the reciprocity error between the TX and RX antenna lineups of the base station can be expressed as $\square_b(t, P, T) = A_b(t, P, T)e^{j\square_b(t, P, T)}$, wherein $\square$ denotes a diagonal entry on the reciprocity error matrix $E_b$.

Therefore, The response of TX antenna lineup may be calculated from the RX antenna lineup and the reciprocity error matrix, $$H_{bt} = E_b H_{br}$$

Because both $E_b$ and $H_{br}$ are diagonal matrices, $E_b$ and $H_{br}$ are commutable. In most reciprocity simulations, the absolute RF antenna lineup responses might be not a real performance factor. To the contrary, the relative difference values between TX and RX antenna lineups, such as the reciprocity error matrix $E_b$, might play the real role.

All above description is about the base station side. Extension of the model to the mobile station side is straightforward. By including the non-reciprocity effect of both the base station side and the user terminal side, we have, $$H_{DL,eff} = H_{mr} H_{DL} H_{bt}$$

$$H_{UL,eff} = H_{br} H_{UL} H_{mt}$$

Wherein $H_{DL} = H_{UL}^T$. By applying the reciprocity error definitions $$E_b = H_{bt} H_{br}^{-1}$$

$E_m = H_{mt} H_{mr}^{-1}$ to the above equations, the effective downlink and uplink channel may be related as, $$H_{DL,eff} = E_m^{-1} H_{UL,eff}^T E_b$$

This equation can be used to model the reciprocity of the effective uplink and downlink RF channels. OTA interface calibration is a solution of ensuring channel reciprocity, by which the error $E_m^{-1}$ and $E_b$ can be obtained from the uplink and downlink CSI (Channel State Information). The uplink CSI is obtained from uplink estimation, while the downlink CSI is fed back by the calibration user terminals. Usually for downlink transmission, $E_m^{-1}$ influences less, and thus it is also possible to only make calibration for $E_b$ of TX.

Figure 1A:
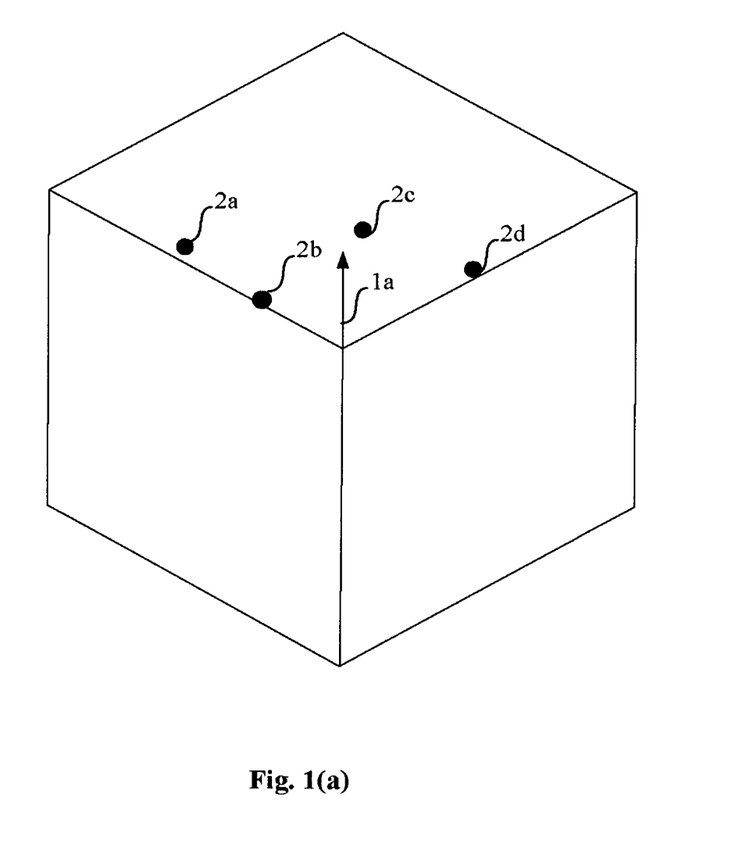
FIG. 1(a) and FIG. 1(b) respectively show the schematic diagrams of topological structure of network according to an embodiment of the present invention.
Figure 1B:
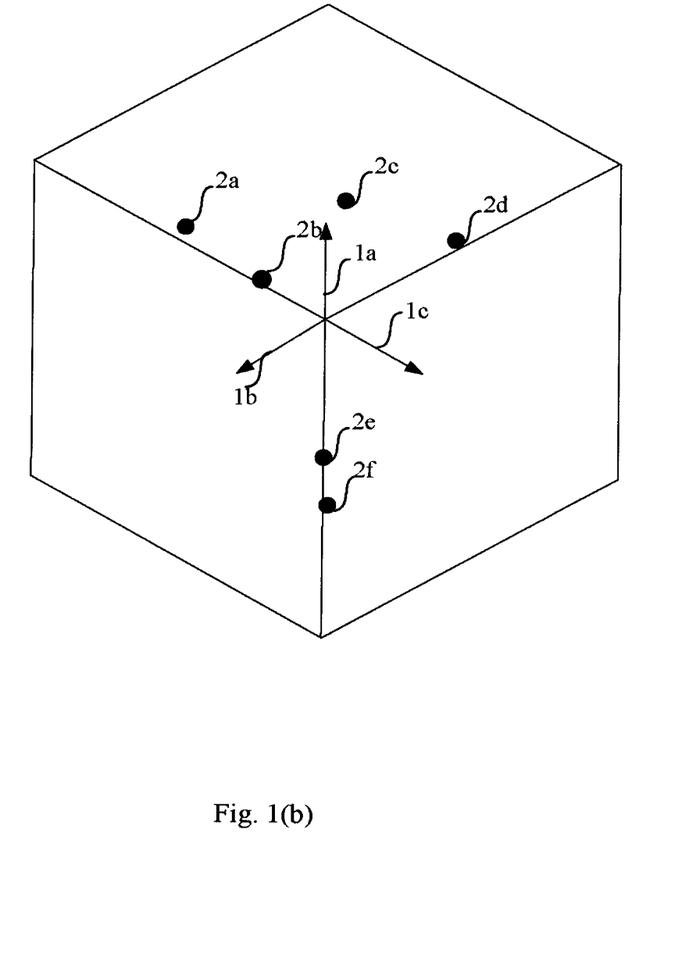

FIG. 1a shows a schematic diagram of topological structure of network according to an embodiment of the present invention, in which base station 1a locates in a single cell system, and FIG. 1b shows another schematic diagram of topological structure of network according to an embodiment of the present invention, in which base station 1a locates in multi-cell CoMP system. In FIG. 1b, base stations 1a, 1b and 1c coordinately serve a plurality of user terminals 2a, 2b, 2c, 2d, 2e and 2f. In FIG. 1b only three coordinately working base stations 1a, 1b and 1c and six user terminals 2a, 2b, 2c, 2d, 2e and 2f are shown. Those skilled in the art may understand that the coordinately working base stations are not limited to the above-mentioned base stations, or it is also possible that there are only two coordinately working base stations, and the user terminals are not limited to the six terminal users shown in FIG. 1b. Further, those skilled in the art should also understand that whether the base station 1a works at single cell mode or at CoMP mode has been determined during initial network planning and deployment. In the following network operation procedure, the base station 1a works according to the configuration during network planning phase.

Figure 2:
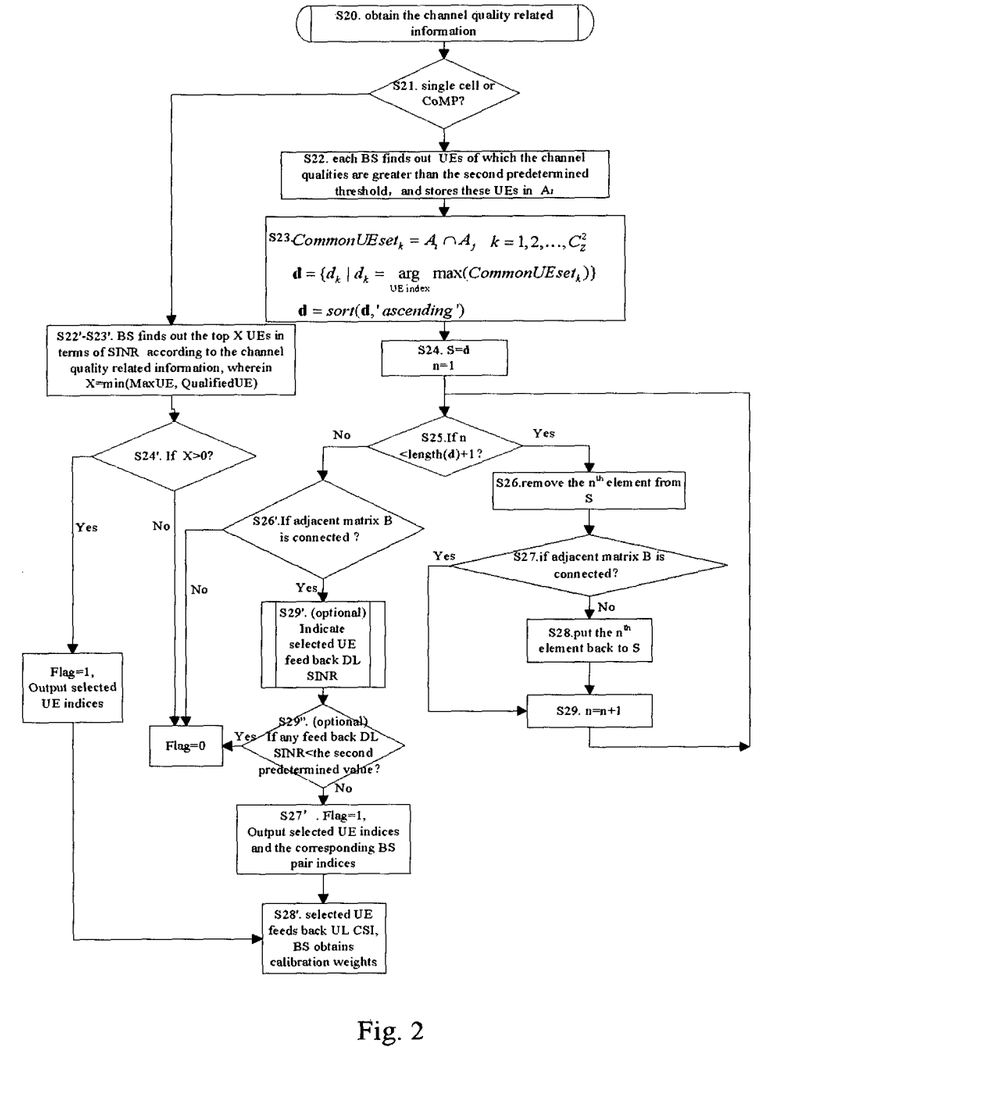
FIG. 2 shows a flow diagram of system method according to an embodiment of the present invention.

FIG. 2 shows a flow diagram of system method according to an embodiment of the present invention. Firstly, in step S20, each of base stations 1a, 1b and 1c respectively obtains channel quality related information between a plurality of user terminals and the base station, in which the channel quality related information between base station and user terminals may be the channel information of uplink estimation as well as downlink channel information fed back by the user terminals. The channel quality information including uplink channel SINR(Signal Interference Noise Ratio) information estimated by base stations 1a, 1b or 1c according to uplink sounding signal transmitted by each of user terminals will be taken as a example to describe.

Then in step S21, base station 1a firstly judges whether the base station works at single cell mode or at CoMP mode. Via configuration of the network parameters, base station 1a knows that it works at single cell mode, and then the method will go into step S22', base station 1a selects at least one candidate user terminal from a plurality of first user terminals, according to the channel quality related information from a plurality of the first user terminals served by the base station 1a, for calibrating said reciprocity error between uplink and downlink, wherein the channel quality between the selected at least one candidate user terminal and base station 1a is greater than a first predetermined threshold F.

The first predetermined threshold F may be the parameters configured by the system at the beginning of network configuration, for example, the first predetermined threshold F is configured as 16 dB. SINRs between base station 1a and user terminals 2a, 2b, 2c and 2d are respectively 18 dB, 22 dB, 25 dB and 18 dB. Therefore, the channel qualities between the base station 1a and user terminals 2a, 2b, 2c and 2d are greater than the first predetermined threshold F, and the base station 1a takes user terminals 2a, 2b, 2c and 2d as candidate user terminals. Here for the reason of briefness, Table.1 only shows the SINR values between each of user terminals and the corresponding base stations greater than the threshold.

Then, in step S23', the base station 1a compares the number of the candidate user terminals with the predetermined number MaxUE, and the lesser value is taken as the final number of calibration user terminals. Namely, the base station 1a judges taking X user terminals as the final calibration user terminals, in which X=min(MaxUE, QualifiedUE), and QualifiedUE denotes the number of selected candidate user terminals, namely, the channel qualities between these candidate user terminals and the base station 1a are greater than the first predetermined threshold F. That a plurality of user terminals having good channel qualities with the base station 1a feed channel information back to the base station 1a may enhance the calibration robustness. However, if too many user terminals feed back channel information so as to be used for calibration, it will cause relatively huge uplink feedback overhead and thus reduce the spectral efficiency. Therefore, limiting the predetermined number MaxUE is beneficial to save the uplink feedback overhead.

Then, in step S24', the base station 1a judges whether X is greater than 0 or not. if X is greater than 0, the index flag will be determined as 1, which means that at least one user terminal for calibrating the base station is found, and the selected user terminal indices are outputted; otherwise the index flag will be determined as 0, which means no user terminal for calibrating the base station is found.

If in step S21 base station 1a knows that it works at CoMP mode via the configuration of the network parameters, namely, Z base stations including base station 1a work coordinately, in the following Z=3 is taken as a example to describe, namely, there are three base stations 1a, 1b and 1c in coordinated cell cluster. Then the method will go into step S22, each of the base stations 1a, 1b and 1c selects at least one candidate user terminal from these user terminals according to the channel quality related information between itself and each of user terminals respectively obtained by each of base station, wherein, the channel qualities between these selected candidate user terminals and base station are greater than the second predetermined threshold.

For example, the second predetermined threshold K=16 dB. Similarly to the example at single cell mode, SINRs between base station 1a and user terminals 2a, 2b, 2c and 2d are respectively 18 dB, 22 dB, 25 dB and 18 dB; further, SINRs between base station 1b and user terminals 2b, 2e and 2f are respectively 21 dB, 18 dB and 17 dB; SINRs between base station 1c and user terminals 2d, 2e and 2f are respectively 18 dB, 21 dB and 17 dB; the details are shown in the following table:

TABLE 1

| SINR | UE 2a | UE 2b | UE 2c | UE 2d | UE 2e | UE 2f |
|---|---|---|---|---|---|---|
| base station 1a | 18 dB | 22 dB | 25 dB | 18 dB | | |
| base station 1b | | 21 dB | | | 18 dB | 17 dB |
| base station 1c | | | | 18 dB | 21 dB | 17 dB |

Wherein, the channel qualities between the base station 1a and user terminals 2a, 2b, 2c and 2d are greater than the second predetermined threshold K; the channel qualities between the base station 1b and user terminals 2b, 2e and 2f are greater than the second predetermined threshold K; the channel qualities between the base station 1c and user terminals 2d, 2e and 2f are greater than the second predetermined threshold K. Each of base stations 1a, 1b, 1c respectively generates candidate set $A_i$, i=1, ..., Z, and each candidate set comprises the user terminal, wherein, the channel qualities between the user terminals and the base stations are greater than the second predetermined threshold. For example, candidate set $A_1$ generated by the base station 1a is $A_1$={UE 2a, UE 2b, UE 2c, UE 2d}, candidate set $A_2$ generated by the base station 1b is $A_2$={UE 2b, UE 2e, UE 2f}, candidate set $A_3$ generated by the base station 1c is $A_3$={UE 2d, UE 2e, UE 2f}. Then, the base station 1b reports the user/terminal indices of user terminals 2b, 2e and 2f and the base station index to the base station 1a, wherein, the channel qualities between the base station and the user terminals 2b, 2e and 2f are greater than the second predetermined threshold K, and the base station 1c reports the user terminal indices of user terminals 2d, 2e and 2f and the base station index to the base station 1a, wherein, the channel qualities between the base station and the user terminals 2d, 2e and 2f are greater than the second predetermined threshold K.

Then, in step S23, the base station 1a finds out the common qualified elements for each base station pair from each of sets $A_1$, $A_2$ and $A_3$ and put these common qualified elements into CommonUEset$_k$, namely, finds out CommonUEset$_k$= $A_i \cap A_j$, k=1, 2, ... $C_Z^2$, in which $C_Z^2$=Z(Z-1)$_{1/2}$ is a combination number, which represents all possibilities of selecting two different elements from the set comprising Z elements. For example, CommonUEset$_1$=$A_1 \cap A_2$={UE 2b}, CommonUEset$_2$=$A_1 \cap A_3$={UE 2d} and CommonUEset$_3$=$A_2 \cap A_3$={UE 2e, UE 2f}.

Then, for each CommonUEset$_k$, the base station 1a selects, a user terminal with the largest SINR average value for the base station pair corresponding to the set, in the set, and the selected user terminal is put into a vector d, and the base station pair corresponding to the selected user terminal is recorded. For example, for CommonUEset$_3$, the average SINR of user terminal 2e for base stations 1b and 1c is (18+21)/2=19.5 dB, and the average SINR of user terminal 2f for base stations 1b and 1c is (17+17)/2=17 dB, therefore, user terminal 2e is the user terminal having the largest SINR average value for the base station pair corresponding to the set in the set, and thus the base station 1a selects the user terminal 2e and records the corresponding base station pair, that is to say, the base stations 1b and 1c. Further, similarly, the selected elements in the vector d further comprise the user terminal 2b corresponding to the base stations 1a and 1b and the user terminal 2d corresponding to base stations 1a and 1c.

Then, the base station 1a sorts vector d by ascending according to the average SINR between each of base station pairs and user terminals. Because the average SINR of user terminal 2b for base station pair 1a and 1b is 21.5 dB, and the average SINR of user terminal 2d for base station pair 1a and 1c is 18 dB, and the average SINR of user terminal 2e for base station pair 1b and 1c is 19.5 dB, the result after sorting is {UE 2d, UE 2e, UE 2b}.

Then, in step S24, the base station 1a firstly initializes candidate user terminal set S by S=d, and then initializes n=1: length (d), which means firstly n=1, and then n adds 1 one by one till n=length (d) (the length of vector d).

Then, in step S25, the base station 1a judges whether n is lesser than length (d)+1 or not, if n is lesser than length (d)+1, the method goes into step S26, the base station 1a removes the $n^{th}$ element from the set S, and then in step S27 it judges the connectivity of the adjacent matrix B after removing the $n^{th}$ element. In order to describe the principle of connectivity in the following, without loss of generality, a CoMP coordinated cell cluster comprising five base stations is taken as example to describe.

Firstly, four candidate user terminals are selected, in which each of selected candidate user terminals respectively relates to two base stations of the CoMP cell cluster, namely, the channel qualities between each of the candidate user terminals and the two base stations are both greater than the second predetermined threshold K. Therefore, five base stations of the CoMP cell cluster are divided into four subsets. If the subsets are connected, for example, {1,2},{2,4},{3,5},{4,5}, as shown in FIG. 3(a), namely, any one base station may be directly or indirectly connected to any other base stations, then, partial calibration weights are connected, and thus the overall calibration weights of the entire CoMP cluster may be obtained.

Figure 3A:
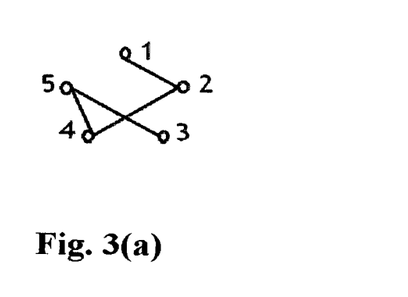
FIG. 3(a) and FIG. 3(b) show different connection diagrams of coordinated cluster composed of five base stations according to embodiments of the present invention.
Figure 3B:
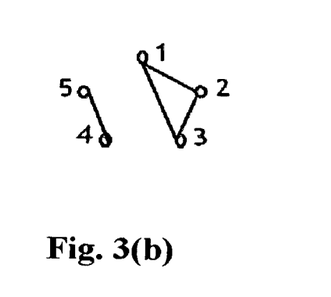

However, as shown in FIG. 3(b), if the subsets of the base stations are unconnected, for example, {1,2},{1,3},{2,3},{4,5}, to be specific, the base stations 4 and 5 are isolated from the base stations 1, 2 and 3, the overall calibration weights of the entire CoMP cluster are not able to be obtained.

The corresponding adjacent matrices $B_C$ and $B_{unC}$ of the two CoMP clusters are respectively listed below.

The adjacent matrices $B_C$ corresponding to the connected graph shown in FIG. 3(a) is $$B_C = \begin{bmatrix} 0 & 1 & 0 & 0 & 0 \\ 1 & 0 & 0 & 1 & 0 \\ 0 & 0 & 0 & 0 & 1 \\ 0 & 1 & 0 & 0 & 1 \\ 0 & 0 & 1 & 1 & 0 \end{bmatrix}, \quad (1)$$

and the adjacent matrices $B_{unC}$ corresponding to the connected graph shown in FIG. 3(b) is $$B_{unC} = \begin{bmatrix} 0 & 1 & 1 & 0 & 0 \\ 1 & 0 & 1 & 0 & 0 \\ 1 & 1 & 0 & 0 & 0 \\ 0 & 0 & 0 & 0 & 1 \\ 0 & 0 & 0 & 1 & 0 \end{bmatrix}. \quad (2)$$

The set of nodes and branches in network is called as graph, denoted as G=(V, E), in which V denotes the set of nodes, $V=\{v_1, v_2, \ldots v_m\}$, m is the number of nodes, which is usually written as m=|V|; E denotes the set of branches, $E=\{e_1, e_2, \ldots, e_n\}$, n is the number of branches, n=|E|. The two nodes corresponding to the branch are u and v, when the flow direction of fluid is irrelevant to the studied question, graph G is called as undirected graph.

If there is at least one path between any two nodes in graph G, the two nodes are called as connected and the graph G is called as connected graph. For undirected graph G=(V, E), m=|V| square matrix $B=(b_{ij})=|e_k|, e_k=\langle v_i, v_j \rangle \in E$, the matrix B is called as node adjacent matrix of graph G.

B to the power of k is denoted as $B^k=(b_{ij}^{(k)})_{m \times m}$, in which $$\left(b_{ij}^{(k)}\right) = \sum_{h=1}^{m} b_{ih}^{(k-1)} b_{hj}.$$

For matrix $$S = (S_{ij})_{Z \times Z} = \sum_{k=1}^{Z-1} B^k, \quad (3)$$

if all elements in matrix S are nonzero elements, the graph G is connected graph; otherwise if there are T zero elements in matrix S, the graph G is unconnected graph, in which B is the node adjacent matrix of graph G.

For the equation (1) and (2), corresponding to $B_C$ in equation (1), $$S = \begin{vmatrix} 3 & 3 & 1 & 4 & 1 \\ 3 & 7 & 1 & 4 & 5 \\ 1 & 1 & 3 & 4 & 3 \\ 4 & 4 & 4 & 8 & 4 \\ 1 & 5 & 3 & 4 & 7 \end{vmatrix},$$

and corresponding to $B_{unC}$ in equation (2), $$S = \begin{vmatrix} 10 & 10 & 10 & 0 & 0 \\ 10 & 10 & 10 & 0 & 0 \\ 10 & 10 & 10 & 0 & 0 \\ 0 & 0 & 0 & 2 & 2 \\ 0 & 0 & 0 & 2 & 2 \end{vmatrix}.$$

Therefore, the graph corresponding to graph 3(a) is connected graph, and the graph corresponding to graph 3(b) is unconnected graph.

Back to the above-mentioned CoMP cluster comprising three base stations 1a, 1b and 1c and six user terminals 2a-2f. Wherein, in step 23, the result after sorting is that vector d is {UE 2d, UE 2e, UE 2b}. And then, in step 26 the base station 1a firstly removes the first element UE 2d in d, namely, the user terminal with the worst average channel qualities with two base stations desired to calibrate. Then, in step 27, the base station 1a judges whether the remaining elements in d make the graph comprised by the base stations in CoMP cluster connected. Because the remaining two elements guarantee the cluster comprised by base stations 1a, 1b and 1c connected, then the method goes into step S29, 1 is added to n, then, the method returns to step S25 and whether n is lesser than length(d)+1 will be judged, if yes, step S26 is repeated, the base station 1a further removes the first element according to the sorting in the rest of the vector d, namely the user terminal having the worst average channel qualities with the selected base stations in the rest of vector d, namely UE 2e. Then, the base station 1a further judges whether the remaining elements in d make the graph comprised by the base stations in cell cluster connected. Because only one element remains, UE2b, which is not able to make the base stations 1a, 1b and 1c connected, and thus, in step 28, the base station 1a puts UE 2e back into the vector d. Then, the method goes into step S25, and the judging result is no, and thus the method goes into step S26'.

In the judging procedure of step S26', if the adjacent matrix B is judged as connected, then in step S27' the base station 1a sets the index flag as 1, and the index 1 indicates that enough qualified user terminals are found, and the set S at this time and corresponding base station pair index are outputted. For example, in above-mentioned step S26', the base station 1a finds UE 2e and UE 2b can make the base stations 1a, 1b and 1c connected, and thus the base station 1a takes the set S{UE 2e, UE 2b} as candidate user terminals and outputs the corresponding base station pairs {the base station 1b, the base station 1c} and {the base station 1a, the base station 1b}; otherwise, the method goes into step S27', the base station 1a sets the index flag as 0, and the index 0 indicates that no enough qualified user terminals is found.

In above-mentioned embodiment, the channel quality related information comprises SINR information of the uplink channel obtained by the base stations 1a, 1b and 1c. Because the estimated uplink channel information might not perfectly match with actually required downlink channel information, alternatively, the step S29' is further included after the step S26' and before the step S27', that is, the base station 1a indicates the above selected user terminals 2e and 2b to feed back downlink CSI (Channel State Information). Alternatively, in step S29'', the base station 1a re-judges the downlink channel information fed back by the user terminals 2e and 2b according to the downlink channel information fed back by the calibration user terminals 2b and 2d, for example, whether SINR is greater than the above-mentioned second predetermined threshold. When the downlink channel information fed back by the calibration user terminals 2e and 2b are both greater than the second predetermined threshold, the method goes into step S27', the base station 1a will obtain calibration weights of the entire cluster according to the set S {UE 2e, UE 2b} comprising the selected calibration user terminals, the downlink channel state information fed back by the calibration user terminals 2e and 2b, the estimated uplink channel state information between the user terminal 2e and 2b, the corresponding base station pairs {the base station 1b, the base station 1c} and {the base station 1a, the base station 1b}, so as to make the calibration between uplink and downlink in TDD.

Those skilled in the art may understand that the above-mentioned method is also suitable for the single cell scenario, namely, in step S22', if the base station 1a works at single cell mode, the channel quality related information with user terminals 2a, 2b, 2c and 2d obtained by the base station 1a are all uplink channel estimation information, then in a variable embodiment, after the step S23' that the base station 1a selects the calibration user terminals, it may also indicate the selected user terminals to measure and feed back downlink channel information. Then, the base station 1a makes the calibration between uplink and downlink according to the downlink channel information fed back by the candidate user terminals and the uplink channel information estimated by the base station.

In above-mentioned embodiments, SINR is taken as an example to describe the channel quality information. In optional embodiments, the channel quality information may also include other channel quality measurement parameters influencing the channel estimation accuracy.

In above-mentioned each of embodiments, the implementing subject of each step is the base station 1a, namely, the base station 1a acts as the first base station, and the base station 1b and 1c act as the second base station neighbouring the first base station, and they report the respectively collected channel quality related information to the base station 1a. Those skilled in the art can completely understand that the present invention is not limited to the above-mentioned network structure. For example, the base stations 1a, 1b and 1c may report their respective channel quality related information to a management network apparatus, which comprises but is not limited to RNC (Radio Network Controller), which manages the base stations 1a, 1b and 1c, namely, the management network apparatus replaces the base station 1a as the execution subject of the corresponding steps shown in FIG. 2.

The selections of the first predetermined threshold and the second predetermined threshold are the same in the above context. Certainly, that the above-mentioned first predetermined threshold and the second predetermined threshold have the same value is only for the purpose of convenience for description. Those skilled in the art may understand, in practice, the above-mentioned two thresholds may have the same or different values, as well as values different from above-mentioned example according to particular system configurations and the settings from network administrators.

In above-mentioned embodiments, that each user terminal calibrates two base stations is taken as example to describe. Certainly, without loss of generality, the number of base stations which each user terminal may calibrate is not limited to two, for example three. Then, in step S23, the expression of CommonUEset$_k$ is accordingly modified to CommonUEset$_k$=A$_i$∩A$_j$∩A$_q$, k=1,2, . . . , C$_Z^3$, in which $$C_Z^3 = \frac{Z(Z-1)(Z-2)}{2 \times 3}.$$

In above-mentioned embodiments, one user terminal is once selected to calibrate one base station pair so that the feedback overhead is the least. In another variable embodiment, if a plurality of user terminals are once selected to calibrate each base station, in step S23, for each base station pair, namely CommonUEset$_k$, a plurality of user terminals having the best average channel qualities with the base station pairs are selected and the selected plurality of user terminals are putted into the matrix D. For example, still referring to Table 1, the best two user terminals {UE 2e, UE 2f} for the base station pair {the base station 1b, the base station 1c} are taken out and putted into the matrix D. In the following the elements in matrix D are sorted according to the average SINR of user terminal groups. Because average SINR of the UE 2e and UE 2f for the base station pair 1b and 1c is (18+21+17+17)/4=18.25 dB, the average SINR of the user terminal subset {UE 2e, UE 2f} is greater than the average SINR 18 dB of the user terminal 2d corresponding to the base station pair 1a and 1c, and is lesser than the average SINR 21.5 dB of the user terminal 2b corresponding to the base station pair 1a and 1b. Therefore, in step S24, let S=D, and thus in step 26, UE 2d is removed from the set S first, and then the judgement in step S27 is performed, 1 is added to n in step S29, the judgement in step S25 is performed, then in step S26, the user terminal subset {UE 2e, UE 2f} is removed from the set S, and the subsequent judgement is performed. Because the subsequent steps are similar to above described embodiments, which is not repeated. In the embodiment, because each base station pair uses a plurality of user terminals to calibrate, the robustness is further improved.

Certainly, the values listed in each of above-mentioned embodiments are only exemplary. Those skilled in the art may understand that the above-mentioned parameters may be measured completely in real-time in actual system operation, and the above-mentioned parameters might also be different for different topological structure of network.

The three sites shown in FIG. 1(b) locate in a same hexagonal cellular cell, but those skilled in the art may fully understand that the base station desired to be calibrated may respectively locate in different cellular cells.

Hereinbefore, the present invention is described from the aspect of method flow; the present invention will be described from the aspect of device hereinafter. A device 40 shown in FIG. 4 locates in the base station 1a shown in FIG. 1(a) and FIG. 1(b), certainly the device 40 may also locate in the base stations 1b, 1c.

Figure 4:
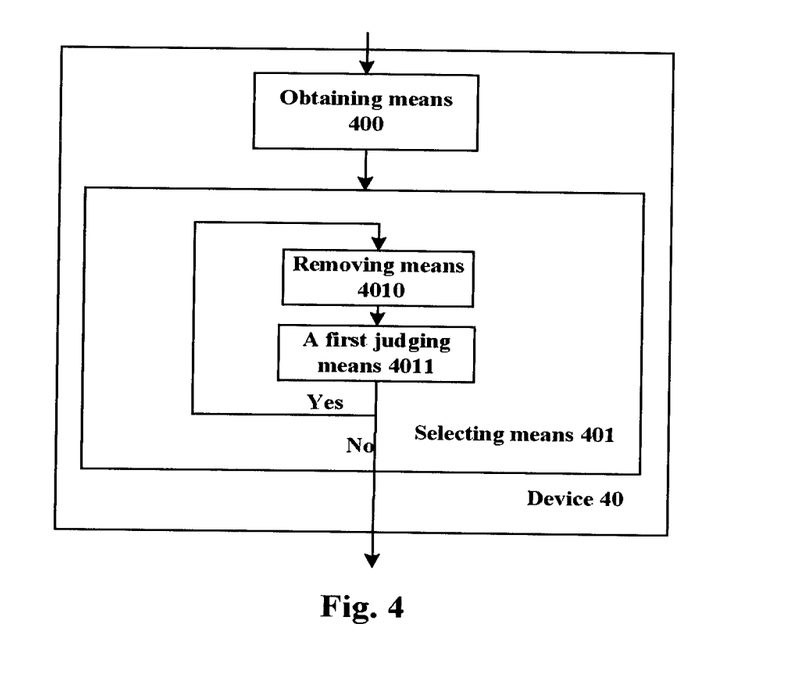
FIG. 4 shows the block diagram of device according to an embodiment of the present invention.

The device 40 comprises an obtaining means 400, and a selecting means 401. The selecting means 401 further comprises a removing means 4010 and a first judging means 4011.

Firstly, the obtaining means 400 obtains channel quality related information between a plurality of first user terminals and a first base station 1a, wherein, the channel quality related information is used for indicating channel qualities between the plurality of first user terminals and the first base station.

Then, the selecting means 401 selects at least one first user terminal as calibration user terminal for calibrating reciprocity error between uplink and downlink, according to the channel quality-related information.

In particular, when the base station 1a works at single cell mode, the selecting means 401 firstly selects at least one candidate user terminal from the plurality of first user terminals according to the channel quality related information, wherein the channel quality between the at least one candidate user terminal and the first base station 1a is greater than a first predetermined threshold. The Table 1 with the first predetermined threshold F=16 dB is still taken as example to describe. For example, the user terminals 2a, 2b, 2c and 2d are selected. And then, the selecting means 401 judges whether the number of the at least one candidate user terminals 2a, 2b, 2c and 2d is greater than the predetermined number MaxUE.

The MaxUE user terminal which is the top MaxUE user terminal as to the channel quality with the first base station in the at least one candidate user terminal is taken as the calibration user terminal, when the number of the at least one candidate user terminal is greater than MaxUE. For example, the number MaxUE is set to 2, then the top 2 user terminals UE 2c and UE 2b in the at least one candidate user terminal are taken as calibration user terminal.

The at least one candidate user terminal is taken as the calibration user terminal when the number of the at least one candidate user terminal is less than or equal to the predetermined number MaxUE. For example, the number MaxUE is set to 5, candidate user terminals UE 2c, UE 2b, UE 2a and UE 2d are all taken as calibration user terminals.

In another embodiment, when the first base station 1a and at least one neighboring second base station constitute a coordinated base station cluster and work coordinately, for example as shown in FIG. 1(b), the neighboring second base stations include the base stations 1b and 1c, the obtaining means 400 is further used for obtaining at least one first user terminal and a plurality of second user terminals, wherein the channel quality between the at least one first user terminal and the first base station 1a is greater than a second predetermined threshold and the channel qualities between the plurality of second user terminals and the at least one second base station 1b or 1c are greater than the second predetermined threshold.

Then, the selecting means is further used for taking the user terminal among the plurality of first user terminal and the plurality of second user terminals as candidate user terminal, wherein the channel qualities between the candidate user terminal and at least two base stations are greater than the second predetermined threshold; then, taking the minimum number of the candidate user terminals which make the coordinated base station cluster connected as the calibration user terminal, wherein the coordinated base station cluster is connected when there is no nonzero element in $$S = (S_{ij})_{Z \times Z} = \sum_{k=1}^{Z-1} B^k,$$

wherein B denotes node adjacent matrix, $B^K$ denotes B to the power of k, Z denotes total number of base stations in the coordinated base station cluster.

To be detailed, the selecting means 401 further comprises:

a removing means 4010, for removing at least one candidate user terminal which has minimal average channel quality one after another according to average channel quality of the candidate user terminals, wherein the average channel quality of candidate user terminals comprises the average value of channel qualities between the candidate user terminal and at least two base stations, and the channel qualities between the candidate user terminal and the at least two base stations are both greater than the second predetermined threshold;

a first judging means 4011 used for judging whether the rest of the plurality of candidate user terminals can make the coordinated base station cluster connected;

the removing means 4010 and the first judging means 4011 repeat the above-mentioned operation till the rest of the plurality of candidate user terminals can't make the coordinated base station cluster connected, when the rest of the plurality of candidate user terminals can make the coordinated base station cluster connected;

then, the selecting means 401 is further used for taking the minimal number of the rest of candidate user terminals which can make the coordinated base station cluster connected as the calibration user terminal.

In a variable embodiment, when the channel quality comprises SINR information, the obtaining means 400 is further used for:

obtaining downlink CQI (Channel Quality Indication) fed back by the plurality of first user terminals, and then obtaining the SINR information according to the downlink CQI.

In a variable embodiment, when the base station 1a is in single cell scenario, the channel quality further comprises uplink channel estimation information obtained by the base station, then, the obtaining means 400 is further used for obtaining downlink channel quality information fed back by the calibration user terminal; then, the device 40 further comprises a second judging means (not shown in FIG. 4), for judging whether the downlink channel quality fed back by the calibration user terminal is greater than the first predetermined threshold; the device 40 is further used for calibrating the reciprocity error between uplink and downlink according to the calibration user terminal, when the downlink channel quality fed back by the calibration user terminal is greater than the first predetermined threshold; otherwise, the device 40 can not calibrate the reciprocity error between uplink and downlink according to the calibration user terminal.

In a variable embodiment, when the base station 1a is in CoMP scenario, and the channel quality comprises uplink channel estimation information obtained by the base station, the obtaining means 400 is further used for obtaining downlink channel quality information fed back by the calibration user terminal. Then the device 40 further comprises: a third judging means (not shown in FIG. 4) for judging whether the downlink channel quality fed back by the calibration user terminal is greater than the second predetermined threshold; the device 40 is further used for calibrating reciprocity error between uplink and downlink according to the calibration user terminal, when the downlink channel quality fed back by the calibration user terminal is greater than the second predetermined threshold.

The simulation result according to the present invention is presented in the following. Firstly, the simulation parameters are shown in the following Table.2:

TABLE 2

| | |
|---|---|
| BS antenna number | 4 |
| UE antenna number | 2 |
| BS antenna space | 0.5 |
| UE antenna space | 0.5 |
| Antenna polarization | Non-polarizateted |
| Total cell number in the system | 57 wrap around |
| Cell number in a CoMP cluster | 3 |
| SCM channel | UMI (Urban Micro) |
| UE velocity | 3 km/h |
| Average user number per cell | 10 |
| Threshold Γ | 16 dB |

The simulation results of single cell MU-MIMO (Multi-User Multi-Input Multi-Output) are shown in Table 3, where the top 3 user terminals are selected as the calibration user terminals. The average throughput only drops 1.48% by using the OTA calibration present by the present invention. The hardware self calibration results are also shown in Table 3: a (1 dB, 10 deg) residual error causes 24.8% throughput loss, while a (0.5 dB, 5 deg) residual error causes 7.73% throughput loss.

The hardware self calibration accuracy is highly depending on the RF circuitry, which means that more cost is necessary for high accuracy.

TABLE 3

| Single cell MU-MIMO | Average throughput | Average throughput gain relative to ideal reciprocity case |
|---|---|---|
| Ideal reciprocity | 4.0367 | 0.00% |
| Hardware self calibration, only residual reciprocity error (1 dB, 10 deg) | 3.0354 | −24.80% |
| Hardware self calibration, only residual reciprocity error (0.5 dB, 5 deg) | 3.7245 | −7.73% |
| Frequency selective reciprocity error without calibration | 1.821 | −54.89% |
| Frequency selective reciprocity error, with the proposed single cell enhanced OTA calibration (3 calibration UEs with best SINR) | 3.9768 | −1.48% |

In Table 4, the simulation results for intra-site CoMP are shown. The same residual error (1 dB, 10 deg) reduces the throughput about 41.97%. It is obvious that CoMP is more sensitive to reciprocity error compared with single cell MU-MIMO.

The user terminal selection scheme of the present invention is very efficient for this scenario. If the single cell best SINR scheme is simply introduced for CoMP calibration user terminal selection, the throughput will drop about 36.75%. However, the average throughput only drops 23.70% by using the connected partial Best SINR scheme for CoMP in the preferable embodiment of the present invention. In addition, two user terminals may be used for calibration, and the average throughput is improved 13%.

TABLE 4

| Intra-site CoMP | Average throughput | Average throughput gain relative to ideal reciprocity case |
|---|---|---|
| Ideal reciprocity | 6.2228 | 0.00% |
| Hardware self calibration, only residual reciprocity error (1 dB, 10 deg) | 3.6113 | −41.97% |
| Hardware self calibration, only residual reciprocity error (0.5 dB, 5 deg) | 5.3544 | −13.96% |
| Frequency selective reciprocity error without calibration | 1.0158 | −83.68% |
| Frequency selective reciprocity error, maximum average SINR UE selection (3 calibration UEs) | 3.9361 | −36.75% |
| Frequency selective reciprocity error, with the proposed enhanced OTA calibration (2 calibration UEs) | 4.7482 | −23.70% |

It should be noted that the above-mentioned embodiment is only illustrative rather than limitation to the present invention. Any technical solutions without departing from the spirit of the present invention should fall within the protection scope of the present invention, which comprises: the different technical features used in different embodiments may be combined with each other so as to obtain beneficial effect. In addition, any reference signs in the claims should not be regarded as limiting the related claims; the term "comprise" does not exclude the device or steps not listed in other claims or descriptions; the term "a/an" preceding an element does not exclude a plurality of such element exist; in a device comprising a plurality of means, the function of at least one of the plurality of means may be implemented by the same hardware or software module; the terms such as "first", "second", "third" are used to represent name rather than any specific order.

The invention claimed is:

1. A method of selecting a user terminal so as to enhance calibration for reciprocity error between uplink and downlink, in a network equipment in time division duplex communication systems, comprising:
obtaining channel quality related information between a plurality of first user terminals and a first base station, wherein said channel quality related information is used for indicating channel qualities between said plurality of first user terminals and said first base station; and
selecting at least one first user terminal as a calibration user terminal or terminals for calibrating said reciprocity error between uplink and downlink according to said channel quality related information;
wherein when said first base station works at single cell mode, said selecting further comprises:
selecting at least one candidate user terminal from said plurality of first user terminals according to said channel quality related information, wherein the channel quality between said at least one candidate user terminal and said first base station is greater than a first predetermined threshold;
judging whether the number of said at least one candidate user terminal is greater than a predetermined number N;
taking N user terminal or terminals which is/are the top N user terminal or terminals as to the channel quality with said first base station in said at least one candidate user terminal as said calibration user terminal or terminals, when the number of said at least one candidate user terminal is greater than N; and
taking said at least one candidate user terminal as said calibration user terminal or terminals, when the number of said at least one candidate user terminal is less than or equal to N.

2. A method of selecting a user terminal so as to enhance calibration for reciprocity error between uplink and downlink, in a network equipment in time division duplex communication systems, comprising:
obtaining channel quality related information between a plurality of first user terminals and a first base station, wherein said channel quality related information is used for indicating channel qualities between said plurality of first user terminals and said first base station; and
selecting at least one first user terminal as a calibration user terminal or terminals for calibrating said reciprocity error between uplink and downlink according to said channel quality related information;
wherein when said first base station and at least one neighboring second base station constitute a coordinated base station cluster and work coordinately, said obtaining further comprises:
obtaining at least one first user terminal and, a plurality of second user terminals, wherein, the channel quality between said at least one first user terminal and said first base station is greater than a second predetermined threshold, and the channel qualities between said plurality of second user terminals and said at least one second base station are greater than said second predetermined threshold;

said selecting further comprises:

taking at least one user terminal among said at least one first user terminal and said plurality of second user terminal as candidate user terminal or terminals, wherein the channel qualities between said at least one user terminal and at least two base stations are greater than said second predetermined threshold;

taking a plurality of said candidate user terminals which make said coordinated base station cluster connected as said calibration user terminal or terminals, wherein, said coordinated base station cluster is connected when there is no nonzero element in $$S = (S_{ij})_{Z \times Z} = \sum_{k=1}^{Z-1} B^k,$$

wherein, B denotes node adjacent matrix, $B^K$ denotes the Kth power of B, Z denotes total numbers of base stations in said coordinated base station cluster.

3. A method according to claim 2, wherein said taking a plurality further comprises:

removing at least one candidate user terminal which has minimal average channel quality one after another according to average channel quality of said candidate user terminals, wherein said average channel quality of candidate user terminals comprises the average value of channel qualities between said candidate user terminal and at least two base stations, and the channel qualities between said candidate user terminal and said at least two base stations are both greater than said second predetermined threshold;

judging whether the rest of the plurality of candidate user terminals can make said coordinated base station cluster connected;

repeating said removing and judging until the rest of a plurality of candidate user terminals can't make said coordinated base station cluster connected, when said rest of said plurality of candidate user terminals can make said coordinated base station cluster connected;

taking the minimal number of said rest of candidate user terminals which can make said coordinated base station cluster connected as said calibration user terminal.

4. A method according to claim 1, wherein when said channel quality comprises signal to interference plus noise ratio information, said obtaining further comprises:

obtaining downlink channel quality indication fed back by said plurality of first user terminals;

obtaining said signal to interference plus noise ratio information according to said downlink channel quality indication.

5. A method according to claim 1, wherein when said channel quality comprises uplink channel estimation information obtained by said base station, the method further comprises:

obtaining downlink channel quality information fed back by said calibration user terminal;

judging whether said downlink channel quality fed back by said calibration user terminal is greater than said first predetermined threshold;

calibrating reciprocity error between uplink and downlink according to said calibration user terminal when said downlink channel quality fed back by said calibration user terminal is greater than said first predetermined threshold.

6. A method according to claim 2, wherein when said channel quality comprises uplink channel estimation information obtained by said base station, the method further comprises:

obtaining downlink channel quality information fed back by said calibration user terminal;

judging whether said downlink channel quality fed back by said calibration user terminal is greater than said second predetermined threshold;

calibrating reciprocity error between uplink and downlink according to said calibration user terminal, when said downlink channel quality fed back by said calibration user terminal is greater than said second predetermined threshold.

7. A method according to claim 1, wherein said network equipment comprises said first base station or management network apparatus which manages said first base station and/or said at least one second base station.

8. A device for selecting a user terminal so as to enhance calibration for reciprocity error between uplink and downlink, in a network equipment in time division duplex communication systems, comprising:

an obtainer configured to obtain channel quality related information between a plurality of first user terminals and a first base station, wherein said channel quality related information is used for indicating channel qualities between said plurality of first user terminals and said first base station; and a selector configured to select at least one first user terminal as a calibration user terminal or terminals for calibrating said reciprocity error between uplink and downlink according to said channel quality related information;

wherein when said first base station works in single cell mode, said selector is further configured to:

select at least one candidate user terminal from said plurality of first user terminals according to said channel quality related information, wherein the channel quality between said at least one candidate user terminal and said first base station is greater than a first predetermined threshold;

judge whether the number of said at least one candidate user terminal is greater than a predetermined number N;

take N user terminal or terminals which is/are the top N user terminal or terminals as to the channel quality with said first base station in said at least one candidate user terminal as said calibration user terminal or terminals, when the number of said at least one candidate user terminal is greater than N; and take said at least one candidate user terminal as said calibration user terminal or terminals, when the number of said at least one candidate user terminal is less than or equal to N.

9. A device for selecting a user terminal so as to enhance calibration for reciprocity error between uplink and downlink, in a network equipment in time division duplex communication systems, comprising:

an obtainer configured to obtain channel quality related information between a plurality of first user terminals and a first base station, wherein said channel quality related information is used for indicating channel qualities between said plurality of first user terminals and said first base station; and a selector configured to select at least one first user terminal as a calibration user terminal or terminals for calibrating said reciprocity error between uplink and downlink according to said channel quality related information;

wherein when said first base station and at least one neighboring second base station constitute a coordinated base station cluster and work coordinately, said obtainer is further configured to:

obtain at least one first user terminal and, a plurality of second user terminals, wherein, the channel quality between said at least one first user terminal and said first base station is greater than a second predetermined threshold, and the channel qualities between said plurality of second user terminals and said at least one second base station are greater than said second predetermined threshold;

said selector is further configured to:

take at least one user terminal among said at least one first user terminal and said plurality of second user terminal as candidate user terminal or terminals, wherein the channel qualities between said at least one user terminal and at least two base stations are greater than said second predetermined threshold;

take a plurality of said candidate user terminals which make said coordinated base station cluster connected as said calibration user terminal or terminals, wherein, said coordinated base station cluster is connected when there is no nonzero element in $$S = (S_{ij})_{Z \times Z} = \sum_{k=1}^{Z-1} B^k,$$

wherein, B denotes node adjacent matrix, $B^K$ denotes the Kth power of B, Z denotes total numbers of base stations in said coordinated base station cluster.

10. A device according to claim 9, wherein, said selector further comprises:

a remover configured to remove at least one candidate user terminal which has minimal average channel quality one after another according to average channel quality of said candidate user terminals, wherein said average channel quality of candidate user terminals comprises the average value of channel qualities between said candidate user terminal and said at least two base stations, and the channel qualities between said candidate user terminal and at least two base stations are both greater than said second predetermined threshold;

a first judger configured to judge whether the rest of said plurality of candidate user terminals can make said coordinated base station cluster connected;

said remover and said first judger repeat above-mentioned operation until said rest of said plurality of candidate user terminals can't make said coordinated base station cluster connected, when said rest of said plurality of candidate user terminals can make said coordinated base station cluster connected;

said selector is further configured to take the minimal number of said rest of candidate user terminals which can make said coordinated base station cluster connected as said calibration user terminal.

11. A device according to claim 8, wherein when said channel quality comprises signal to interference plus noise ratio information, said obtainer is further configured to:

obtain downlink channel quality indication fed back by said plurality of first user terminals;

obtain said signal to interference plus noise ratio information according to said downlink channel quality indication.

12. A device according to claim 8, wherein said channel quality comprises uplink channel estimation information obtained by said base station;

said obtainer is further configured to:

obtain downlink channel quality information fed back by said calibration user terminal;

said device further comprises:

a second judger configured to judge whether said downlink channel quality fed back by said calibration user terminal is greater than said first predetermined threshold;

said device is further configured to calibrate said reciprocity error between uplink and downlink according to said calibration user terminal, when said downlink channel quality fed back by said calibration user terminal is greater than said first predetermined threshold.

13. A device according to claim 9, wherein said channel quality comprises uplink channel estimation information obtained by said base station;

said obtainer is further configured to:

obtain downlink channel quality information fed back by said calibration user terminal;

said device further comprises:

a third judger configured to judge whether said downlink channel quality fed back by said calibration user terminal is greater than said second predetermined threshold;

said device is further configured to calibrate reciprocity error between uplink and downlink according to said calibration user terminal, when said downlink channel quality fed back by said calibration user terminal is greater than said second predetermined threshold.

* * * * *